US005275867A

United States Patent [19]

[11] Patent Number: 5,275,867

[45] Date of Patent: Jan. 4, 1994

Misuda et al.

[54] RECORDING FILM AND RECORDING METHOD

[75] Inventors: Katsutoshi Misuda; Hitoshi Kijimuta; Takafumi Hasegawa; Nobuyuki Yokota, all of Yokohama, Japan

[73] Assignee: Asahi Glass Company Ltd., Tokyo, Japan

[21] Appl. No.: 834,211

[22] Filed: Feb. 12, 1992

[30] Foreign Application Priority Data

Feb. 19, 1991 [JP] Japan .................................. 3-045477
Feb. 21, 1991 [JP] Japan .................................. 3-047402

[51] Int. Cl.$^5$ ................................................ B32B 9/00

[52] U.S. Cl. ................................ 428/195; 428/304.4; 428/323; 428/329; 428/331; 428/411.1; 428/688; 428/914

[58] Field of Search ..................... 428/195, 304.4, 454, 428/914, 331, 336, 520, 323, 329, 411.1, 688; 346/135.1

[56] References Cited

U.S. PATENT DOCUMENTS 4,406,662 9/1983 Beran et al. ............................ 8/471
4,664,952 5/1987 Arai et al. ........................... 428/195
5,104,730 4/1992 Misuda et al. ...................... 428/195

FOREIGN PATENT DOCUMENTS 0407720 1/1991 European Pat. Off. .
2-276671 11/1990 Japan .
928274 6/1963 United Kingdom .

OTHER PUBLICATIONS

Patent Abstracts of Japan, vol. 15, No. 39(M-1075) {4567}, Jan. 30, 1991, and JP-A-02-276 671, Nov. 13, 1990, K. Sumita, et al., "Recording Sheet".

Patent Abstracts of Japan, vol. 15, No. 493(M-1191) {5021}, Dec. 13, 1991, and JP-A-3-215 081, Sep. 20, 1991, K. Sumita, et al, "Recording Sheet".

*Primary Examiner*—Patrick J. Ryan
*Assistant Examiner*—W. Krynski
*Attorney, Agent, or Firm*—Oblon, Spivak, McClelland, Maier & Neustadt

[57] ABSTRACT

A recording film comprising a transparent substrate, a porous alumina hydrate layer formed on the substrate and an opaque porous layer laminated on the alumina hydrate layer.

13 Claims, No Drawings

RECORDING FILM AND RECORDING METHOD

The present invention relates to a recording film having a layer capable of forming an image upon adsorption of a dye and an opaque layer, laminated on a transparent substrate and designed so that printing can be made from the opaque layer side and a glossy clear image can be seen when observed from the transparent substrate side, and a method of recording thereon.

In recent years, along with popularization of ½ inch video recorders, electronic still cameras, computers and the like, hard copy technology has rapidly been developed to record their images on hard copy sheets. The objective of such hard copy technology is to bring the quality of the hard copy as close as possible to the level of silver halide photography. Particularly, how to bring the color reproducibility, the image density, the gloss, the weather resistance and the like close to the level of silver halide photography, is a theme of the development. As a hard copy recording system, in addition to a system wherein an image formed on a display is directly photographed by silver halide photography, various systems are available including a dye diffusion thermal transfer system, an ink jet system and an electrophotography system which is adapted for color printing in various manners by various companies. Among them, the ink jet system is regarded as a main system for hard copy recording, along with the dye diffusion thermal transfer system, since the apparatus is relatively small in size, and the running cost is low.

However, the ink jet system has a problem that it is thereby difficult to obtain a glossy image. In this respect, the dye diffusion thermal transfer system has been better. Further, the ink jet system has a problem that it is not adequate as a substitute for silver halide photography also with respect to the light resistance, since a dye is used as the coloring material.

The present inventors have previously proposed in Japanese Unexamined Patent Publication No. 276671/1990 a recording film which has a gloss and a strong printed surface and which is capable of forming a clear image. This recording film has an alumina hydrate layer and a porous silica layer formed on a transparent substrate. When recording is conducted from the porous silica layer side of this sheet, for example, by an ink jet system, a dye of the ink is adsorbed in the alumina hydrate layer to form an image, and this image is to be seen from the transparent substrate side. In this case, the image is protected by the transparent substrate and thus has an excellent gloss and weather resistance, and the image-forming layer has high strength.

However, the recording film proposed in Japanese Unexamined Patent Publication No. 276671/1990 has a relatively high transparency, and when an image is observed by a reflected light by applying the light from the observation side, it sometimes happens that a clear image can not be seen unless an opaque backing is provided on the rear side. Further, when an image is observed by a transmitted light by disposing a light source behind the recording film, it sometimes happens that the light source itself is seen through the film.

The present invention has been made in view of the above problems. It is an object of the present invention to provide a recording film which is excellent in the gloss and weather resistance and which has a strong image-forming layer, and whereby a clear image can be observed without necessity of an opaque backing even when the image is observed by a reflected light by applying the light from the observation side, or even when an image is observed by a transmitted light by disposing a light source behind the recording film, and a method of recording thereon.

To accomplish the above object, the present invention provides a recording film comprising a transparent substrate, a porous alumina hydrate layer formed on the substrate and an opaque porous layer laminated on the alumina hydrate layer.

Further, the present invention provides a recording method employing the above recording film of the present invention, which method comprises letting a recording ink penetrate from the opaque porous layer side, and letting a dye of the ink be fixed in the alumina hydrate layer.

Now, the present invention will be described in further detail with reference to the preferred embodiments.

The transparent substrate to be used for the present invention, may be any transparent film or sheet and is not particularly limited. For example, various plastic films or sheets made of e.g. polyethylene terephthalate, polyester, polycarbonate or a fluoroplastics such as ETFE, are preferably employed. Further, various glass materials may also be employed. The thickness of such a substrate is not particularly limited and may be selected suitably depending upon the particular purpose.

To such a substrate, surface treatment such as corona discharge treatment may be applied, or an undercoating layer may be provided, as the case requires, to improve the adhesion to the alumina hydrate to be laminated thereon.

The porous alumina hydrate layer of the present invention serves as an ink-receiving layer and is a layer which adsorbs and fixes a dye in the ink. The porous alumina hydrate preferably has a total pore volume of from 0.3 to 1.0 cc/g with pores having a radius of from 10 to 100 Å, so that it shows adequate absorption of the ink and the transparency of the ink-receiving layer is maintained. It is particularly preferred that the average pore radius is from 30 to 100 Å, and the volume of pores having a radius corresponding to this average pore radius ±10 Å, constitutes at least 45% of the total pore volume, so that both the fixing properties of the ink and the transparency of the ink-receiving layer can be satisfied, whereby a clearer image can be obtained. In the present invention, the pore radius distribution was measured by a nitrogen desorption method.

As the porous alumina hydrate which satisfies the above conditions, various types may be employed. However boehmite or pseudoboehmite (AlOOH) is particularly preferred, since it is excellent in color development. Such boehmite or pseudoboehmite can be prepared, for example, from alumina sol such as commercially available "Cataloid AS-3" (tradename, manufactured by Catalysts & Chemicals Ind. Co., Ltd.).

The thickness of the porous alumina hydrate layer can be suitably selected depending upon the particular purpose. However, it is usually preferred that the thickness is from 1 to 100 μm. If the thickness of the alumina hydrate layer is less than 1 μm, it tends to be difficult to adsorb and fix an ink. On the other hand, if it exceeds 100 μm, the transparency or strength is likely to be low.

The porous alumina hydrate layer may be formed not only in a single layer but also in a plurality of laminated layers differing in e.g. porous properties. For example, in the case of color recording, three or four different dyes are employed, and a plurality of alumina hydrate layers having pore sizes which are respectively suitable for the sizes of the respective dye molecules, may be laminated, so that a recording sheet excellent in the color density and the fixing properties, can be obtained.

As a method for forming the porous alumina hydrate layer on a transparent substrate, it is possible to employ, for example, a method which comprises adding a binder to alumina-hydrate to obtain a slurry and coating the slurry on the substrate by means of various coaters such as a roll coater, an air knife coater, a blade coater, a rod coater, a bar coater or a comma coater, followed by drying. As the alumina hydrate, it is preferred to employ boehmite in the form of a sol, since it is thereby possible to readily obtain a flat smooth layer. As the binder, an organic substance such as starch or a modified product thereof, polyvinyl alcohol or a modified product thereof, SBR latex, NBR latex, hydroxy cellulose, or polyvinyl pyrrolidone, may be employed. In order to maintain the mechanical strength of the alumina hydrate layer and the ink-adsorbing properties, it is preferred to use the binder in an amount of from 10 to 50% by weight, based on the alumina hydrate.

In the present invention, the opaque porous layer is provided so that a clear image can be obtained and the light source will not be seen through when the image is observed in such a manner that a light is irradiated from the observing side to observe the image by the reflected light or in such a manner that a light source is disposed behind the recording film to observe the image by the transmitted light. Accordingly, the opacity of the entire film is preferably at least 70%, more preferably at least 85%. In the case where the image is observed by a reflected light, the opaque porous layer may not transmit a light at all. Whereas, in the case where a light source is disposed behind the recording film to observe the image by a transmitted light, the opacity is preferably not higher than 95%.

In the present invention, the opacity is defined as follows in accordance with JIS P8138.

With respect to a recording film having a white standard board (color density: 0.10) placed on its rear side, the color density is measured by a reflected color densitometer, and the obtained value is designated as $D_{28}$. Then, the white standard board is replaced by a black standard board (color density: 1.96), and the color density is measured in the same manner. The obtained value is designated as $D_0$.

Reflectances $R_\infty$ and $R_0$ corresponding to $D_\infty$ and $D_0$ are obtained by the following formula (1) for the relation between a reflectance R and a color density D:

$$D = \log(1/R) \quad (1)$$

Then, the opacity is obtained by the formula (2):

$$Opacity = 100 \times R_0/R_\infty (\%) \quad (2)$$

In the present invention, the opaque porous layer is usually preferably white. However, depending upon a particular application, it may be a layer tinted with a specific color. In the case of a white layer, an addition of a fluorescent brightener may be effective.

The material for the opaque porous layer is not particularly limited. However, the one containing organic or inorganic particles such as particles of e.g. a benzoguanamine resin, a urea-formalin resin, titanium oxide, calcium carbonate, zinc oxide or lead oxide, is preferably employed. Particularly preferred are particles with their surface charge being neutral or negative, since they hardly adsorb the dye in an ink. Such particles may not necessarily be porous themselves, so long as void spaces may be formed among particles when the opaque layer is formed.

It is particularly preferred to employ titanium oxide as the opaque porous layer, since the permeation of the ink dye is thereby excellent, and the opacity will thereby be high. The titanium oxide may be of a rutile type or an anatase type. It is preferred to mix porous silica to such titanium oxide particularly in the case of a machine employing a large amount of an ink.

When the opaque porous layer of the present invention is composed mainly of fibrous particles, the layer will satisfy the above opacity, and permeation of the ink and the strength of the layer will be excellent. As the material of such fibrous particles, an organic and/or inorganic pigment is preferably employed. Typical examples include potassium titanate ($K_2O.6TiO_2$), gypsum, calcium silicate, calcium carbonate and a magnesium compound (such as $MgSO_4.5Mg(OH)_2.3H_2O$). However, according to the study by the present inventors, potassium titanate is particularly preferred from the viewpoint of the permeation of the ink, the opacity and the dispersibility of the coating solution.

The configuration of the fibrous particles is preferably such that the fiber length is from 10 to 200 μm, the fiber diameter is from 0.1 to 2 μm, and the aspect ratio (fiber length/fiber diameter) is from 5 to 2000.

Also in this case, the opaque porous layer is usually preferably white. However, depending upon the particular application, it may be a layer tinted with a specific color. Further, when a white layer is employed, an addition of a fluorescent brightener may be effective.

The opacity of the opaque layer may be increased by mixing an opaque powder such as titanium oxide to the fibrous particles.

Further, an opaque porous layer is formed by mixing silica to the fibrous particles. Such an opaque porous layer is effective particularly in an apparatus employing a large amount of an ink.

Furthermore, the present inventors have found it possible to improve the resolution and the color density of an image by providing a solvent-absorbing layer between the porous alumina hydrate layer and the opaque porous layer or over the opaque porous layer. As the solvent-absorbing layer, various porous materials may be employed. However, porous fine silica powder is particularly preferred, since it is excellent in the transparency and has a large solvent-absorbing capacity.

The thicknesses of the opaque porous layer and the solvent-absorbing layer are suitably selected depending upon the specification of the printing apparatus, particularly the amount of an ink per unit area. However, they are usually preferably within a range of from 1 to 100 μm. These layers may be formed by employing a coating method similar to the one used for forming the porous alumina hydrate layer.

The recording film of the present invention thus obtained, may be subjected to calendering, as the case requires, to regulate the pore sizes and to make the surface flat and smooth.

The recording method of the present invention employing the above-described recording film of the present invention, comprises letting a recording ink penetrate from the opaque porous layer side and letting a dye of the ink be fixed in the alumina hydrate layer. The recording system is preferably an ink jet system. It is usual to employ a system wherein an ink containing a dye is employed. Such a recording method is applicable to e.g. various printers, copying machines or video printers. It is also possible to conduct the recording by a dye diffusion thermal transfer system employing a sublimable dye. Further, the recording method may not necessarily be a recording system in the form of a hard copy. For example, recording may be made by hand writing by means of a signing pen, a ball-point pen or a feather pen. The ink may be aqueous or oily.

The recording film of the present invention comprises the porous alumina hydrate layer and the opaque porous layer laminated on the transparent substrate, whereby the porous alumina hydrate layer serves to adsorb a dye in the ink to form an image, while the opaque porous layer has a nature to let the ink permeate to the porous alumina hydrate layer side and serves to provide an opaque background. Accordingly, when printing is conducted by letting an ink penetrate from the opaque porous layer side and the image formed is observed from the transparent substrate side, a clear image can be seen through the transparent substrate.

Thus, the image forming surface is covered by the transparent substrate and thus is protected from a mechanical contact, a light and an external environment, whereby it is excellent in the weather resistance, the image-forming layer has high strength, and by selecting a glossy material for the substrate, it is possible to remarkably improve the gloss, which used to be poor particularly in the case of printing by an ink jet system. And, the other side is opaque, whereby when the image is observed from the transparent substrate side, a clear image can be observed without necessity of providing an opaque backing in a case where a light is irradiated from the observing side to observe the image by a reflected light, and also in a case where a light source is disposed behind the recording film to observe the image by a transmitted light, it is possible to avoid such a drawback that the light source is seen-through.

In the present invention, in a case where the opaque porous layer is composed mainly of fibrous particles, coating can be conducted uniformly with excellent dispersibility to obtain a layer excellent in the strength and ink-permeability. Since the porous layer is excellent in the strength, the film can be subjected to calendering after its preparation, whereby a recording film excellent in the uniformity of pores and the surface flatness can be obtained. Further, by mixing an opaque powder such as titanium oxide, or silica to the fibrous powder as the case requires, it is possible to improve the opacity or to make the film applicable to an apparatus employing a large amount of an ink. Further, when the opaque porous layer is required to be a white layer, a fluorescent brightener may be added. The opaque porous layer may not be white i.e. it may be tinted to have a specific color. Thus, the recording film can be employed for various purposes.

To conduct recording on the recording film of the present invention, a recording ink is permitted to penetrate from the opaque porous layer side. The ink penetrates through the opaque porous layer and is adsorbed and fixed in the porous alumina hydrate layer. Further, by providing a third porous layer between the porous alumina hydrate layer and the opaque porous layer, it is possible to let the solvent in the ink be absorbed and fixed in the third porous layer, so that in the porous alumina hydrate layer, the dye in the ink will be absorbed and fixed, whereby the resolution and the color density of the image can further be improved.

Now, the present invention will be described with reference to Examples. However, it should be understood that the present invention is by no means restricted to such specific Examples.

EXAMPLE 1

To 5 parts by weight (solid content) of alumina sol (Cataloid AS-3, manufactured by Catalysts & Chemicals Ind. Co., Ltd.), 1 part by weight (solid content) of polyvinyl alcohol (hereinafter referred to as PVA) was added, and water was further added thereto to obtain a coating solution having a solid content of about 10% by weight. This coating solution was coated on a substrate in the form of a sheet made of a polyethylene terephthalate (thickness: 100 μm, type 0, manufactured by Teijin Ltd.) and having corona discharge treatment applied thereto, by means of a bar coater so that the dried film thickness would be 10 μm, followed by drying. Then, a slurry mixture of titanium oxide powder (rutile type) and PVA (solid content ratio of 5:1, total solid content: 30% by weight), was coated thereon by means of a bar coater so that the dried film thickness would be 30 μm, followed by drying to obtain a recording film.

EXAMPLE 2

To 5 parts by weight (solid content) of alumina sol (Cataloid AS-3, manufactured by Catalysts & Chemicals Ind. Co., Ltd.), 1 part by weight (solid content) of polyvinyl alcohol was added, and water was further added to obtain a coating solution having a solid content of about 10% by weight. This coating solution was coated on a substrate in the form of a sheet made of polyethylene terephthalate (thickness: 100 μm, type 0, manufactured by Teijin Ltd.) and having corona discharge treatment applied thereto, by means of a bar coater so that the dried film thickness would be 10 μm, followed by drying. This layer was confirmed to be boehmite by the X-ray diffraction. A slurry mixture of porous silica (Carplex #80, manufactured by Shionogi Pharmaceutical Co., Ltd.), titanium oxide powder (rutile type) and PVA (solid content ratio of 10:5:1, total solid content: 15% by weight), was coated thereon by means of a bar coater so that the dried film thickness would be 20 μm, followed by drying to obtain a recording film.

EXAMPLE 3

To 5 parts by weight (solid content) of alumina sol (Cataloid AS-3, manufactured by Catalysts & Chemicals Ind. Co., Ltd.), 1 part by weight (solid content) of polyvinyl alcohol was added, and water was further added to obtain a coating solution having a solid content of about 10% by weight. This coating solution was applied to a substrate in the form of a sheet made of polyethylene terephthalate (thickness: 100 μm, type 0, manufactured by Teijin Ltd.) and having corona discharge treatment applied thereto, by means of a bar coater so that the dried film thickness would be 10 μm, followed by drying. A slurry mixture of porous silica (Carplex #80, manufactured by Shionogi Pharmaceutical Co., Ltd.), and PVA (solid content ratio of 15:1, total solid content: 15% by weight), was coated thereon by means of a bar coater so that the dried film thickness would be 20 μm, followed by drying. Further, a slurry mixture of titanium oxide powder (rutile type) and PVA (solid content ratio of 5:1, total solid content: 30% by weight) was coated thereon by means of a bar coater so that the dried film thickness would be 5 μm.

EXAMPLE 4

A recording film was prepared in the same manner as in Example 3 except that zinc oxide powder was employed instead of the titanium oxide powder.

EXAMPLE 5

Into a glass reactor (a separator flask equipped with a stirrer and a thermometer) having a capacity of 2000 cc, 900 g of water and 751 g of isopropanol were charged and heated to a liquid temperature of 75° C. by a mantle heater. Then, 204 g of aluminum isopropoxide was added thereto under stirring, and hydrolysis was conducted for 24 hours while maintaining the liquid temperature at a level of from 75° to 78° C. Then, the temperature was raised to 95° C., and 9 g of acetic acid was added. The mixture was maintained at a temperature of from 95° to 100° C. for 48 hours for peptization. Further, this liquid was concentrated to 900 g to obtain a white sol. Dried product of this sol was pseudoboehmite having an average pore radius of 60 Å.

To 5 parts by weight (solid content) of this pseudoboehmite sol, 1 part (solid content) of polyvinyl alcohol was added, and water was further added to obtain a coating solution having a solid content of 10% by weight. This coating solution was coated on a substrate in the form of a sheet made of polyethylene terephthalate (thickness: 100 μm, type 0, manufactured by Teijin Ltd.) and having corona discharge treatment applied thereto, by means of a bar coater so that the dried film thickness would be 20 μm, followed by drying to form a porous alumina hydrate layer. On this layer, a porous silica layer and a titanium oxide (rutile type) layer were formed in the same manner as in Example 3 to obtain a recording film.

TEST EXAMPLE 1

With respect to the above five types of recording films, the opacity and the 60° glossiness were measured. The opacity was measured by the above-mentioned method using a reflected color densitometer (PDA-45, manufactured by Konica Corp.). The results are shown in Table 1. Then, a black ink was printed on each film by an ink jet printer FP-510 manufactured by Canon Inc. In each case, an excellent image was obtained, and the color density of the black color was as identified in Table 1. Further, the light resistance of such printed films was tested by a ultraviolet ray fade meter, whereby they were superior in the fade resistance to commercially available coated papers.

TABLE 1

| Example No. | Opacity (%) | 60° Glossiness | Color density of black color |
|---|---|---|---|
| 1 | 95 | 150< | 1.95 |
| 2 | 93 | 150< | 1.98 |
| 3 | 92 | 150< | 2.03 |
| 4 | 89 | 150< | 2.01 |
| 5 | 92 | 150< | 2.04 |

COMPARATIVE EXAMPLE

A recording film having a pseudoboehmite layer of 10 μm on a polyethylene terephthalate substrate and a porous silica layer of 20 μm thereon, was prepared in the same manner as in Example 3 except that no titanium oxide powder was coated. The opacity of this film was 50%.

EXAMPLE 6

To 5 parts by weight (solid content) of alumina sol "Cataloid AS-3" (trademane, manufactured by Catalysts & Chemicals Ind. Co., Ltd.), 1 part by weight (solid content) of PVA were added, and water was further added thereto to obtain a coating solution having a solid content of about 10%. This coating solution was coated on one said of a substrate in the form of a sheet made of a polyethylene terephthalate having a thickness of 100 μm (type 0, manufactured by Teijin Ltd.) and having corona discharge treatment applied thereto, by means of a bar coater so that the dried film thickness would be 10 μm, followed by drying to form a porous alumina hydrate layer.

Then, on this porous alumina hydrate layer, a slurry mixture of potassium titanate ($K_2O.6TiO_2$, mean fiber length 15 μm, mean fiber diameter 0.3 μm) and PVA (solid content ratio of 5:1, total solid content: 30%) was coated by means of a bar coater so that the dried film thickness would be 30 μm, followed by drying to obtain a recording film.

EXAMPLE 7

A porous alumina hydrate layer was formed on a substrate made of polyethylene terephthalate in the same manner as in Example 6.

Then, on the above porous alumina hydrate layer, a slurry mixture of a porous silica "Carplex #80" (tradename, manufactured by Shionogi Pharmaceutical Co., Ltd.), potassium titanate and PVA (solid content ratio of 10:5:1, total solid content: 15%) was coated by means of a bar coater so that the dried film thickness would be 20 μm, followed by drying to obtain a recording film.

EXAMPLE 8

A porous alumina hydrate layer was formed on a substrate made of a polyethylene terephthalate in the same manner as in Example 6.

Then, a slurry mixture of rutile type titanium oxide "Tipake CR-95" (tradename, manufactured by Ishihara Sangyo Kabushiki Kaisha), potassium titanate and PVA (solid content ratio of 10:5:1, total solid content: 15%) was coated by means of a bar coater so that the dried film thickness would be 20 μm, followed by drying to obtain a recording film.

EXAMPLE 9

A porous alumina hydrate layer was formed on a substrate made of polyethylene terephthalate in the same manner as in Example 6.

Then, on the above porous alumina hydrate layer, a slurry mixture of a porous silica "Carplex #80" (tradename, manufactured by Shionogi Pharmaceutical Co., Ltd.) and PVA (solid content ratio of 15:1, total solid content: 15%) was applied by means of a bar coater so that the dried film thickness would be 20 μm, followed by drying. Further, a slurry mixture of potassium titanate and PVA (solid content ratio of 5:1, total solid content: 30%) was coated by means of a bar coater so that the dried film thickness would be 5 μm, followed by drying to obtain a recording film.

TEST EXAMPLE 2

The opacity of each of the recording films obtained in Examples 6 to 9 was measured, and the results are shown in Table 2. The opacity is represented by the above-mentioned method using a reflected color densitometer (PDA-45, manufactured by Konica Corp.).

Further, a black ink was printed on each of the recording films obtained in Examples 6 to 9, from the opaque porous layer side, by means of an ink jet printer FP-510, manufactured by Canon Inc.

As a result, in each case, an excellent image was obtained. The color density of the black color of the obtained image was measured by a densitometer PDA-45, manufactured by Konica Corp. The results are shown in Table 2.

TABLE 2

| | Color density of black color | Opacity |
|---|---|---|
| Example 6 | 1.95 | 95% |
| Example 7 | 1.94 | 93% |
| Example 8 | 1.94 | 97% |
| Example 9 | 2.06 | 90% |

From the results in Table 2, the recording film obtained in Example 6 to 9 are all excellent in the opacity and the color density of black color.

Further, light resistance of the obtained images was tested by an ultraviolet ray fade meter, whereby it was found that the recording films of the present invention were superior in the fade resistance to commercially available coated papers.

As described in the foregoing, according to the recording film of the present invention and the recording method thereon, a recorded sheet can be obtained which comprises a transparent substrate on one side, an opaque layer on the other side, and a layer of forming an image is interposed therebetween, and the recorded sheet is excellent in the gloss and weather resistance, and the image-forming layer is strong. Further, at the time of observing an image, a clear image can be seen without providing an opaque backing in a case where a light is irradiated from the observing side to observe the image by a reflected light, or also in a case where a light source is disposed behind the recording film to observe the image by a transmitted light.

What is claimed is:

1. A recording film comprising a transparent substrate, a porous alumina hydrate layer formed on the substrate and an opaque porous layer laminated on the alumina hydrate layer, said porous alumina hydrate layer being interposed between said substrate and said opaque porous layer, wherein the thickness of the porous alumina hydrate layer is from 1 to 100 μm.

2. The recording film according to claim 1, wherein a solvent-absorbing layer is present between the porous alumina hydrate layer and the opaque porous layer.

3. The recording film according to claim 2, wherein the solvent-absorbing layer is a layer made of a porous fine silica powder.

4. The recording film according to claim 2, wherein the thickness of the solvent-absorbing layer is from 1 to 100 μm.

5. The recording film according to claim 1, wherein the porous alumina hydrate layer is made of boehmite or pseudoboehmite.

6. The recording film according to claim 5, wherein the boehmite or pseudoboehmite has an average pore radius of from 10 to 100 Å.

7. The recording film according to claim 1, wherein the surface charge of the opaque porous layer is neutral or negative.

8. The recording film according to claim 1, wherein the opaque porous layer is made of a material selected from the group consisting of titanium oxide, calcium carbonate, zinc oxide, lead oxide, a benzoguanamine resin and a urea-formalin resin.

9. The recording film according to claim 1, wherein the opaque porous layer is made of fibrous particles of potassium titanate.

10. The recording film according to claim 9, wherein the fiber of the fibrous particles have a length of from 10 to 200 μm, a diameter of from 0.1 to 2 μm, and an aspect ratio of from 5 to 2,000.

11. The recording film according to claim 1, wherein the opaque porous layer is made of a mixture having an opaque powder mixed to fibrous particles of potassium titanate.

12. The recording film according to claim 1, wherein the opacity of the entire film is at least 70%.

13. The recording film according to claim 1, wherein the porous alumina hydrate layer is a single layer of porous alumina hydrate or a plurality of laminated porous alumina hydrate layers differing in porosity.

* * * * *